United States Patent [19]

Araki et al.

[11] Patent Number: 5,646,274

[45] Date of Patent: Jul. 8, 1997

[54] PHTHALOCYANINE MONOAZO COMPOUNDS AND A PROCESS FOR PRODUCING THE SAME

[75] Inventors: Toshiyuki Araki, Hirakata; Takemi Tokieda, Nara; Shin-ichi Yabushita, Osaka; Yasuyoshi Ueda, Hirakata; Bunzi Tsukise, Kobe, all of Japan

[73] Assignee: Sumitomo Chemical Company, Limited, Osaka, Japan

[21] Appl. No.: 550,370

[22] Filed: Oct. 30, 1995

[30] Foreign Application Priority Data

Nov. 4, 1994 [JP] Japan .................. 6-271318

[51] Int. Cl.$^6$ .................. C09B 47/24; C07D 403/10
[52] U.S. Cl. .................. 540/126; 540/123; 540/140; 540/139; 540/133; 8/661
[58] Field of Search .................. 540/123, 124, 540/126, 140

[56] References Cited

U.S. PATENT DOCUMENTS

| | | | |
|---|---|---|---|
| 4,418,015 | 11/1983 | Schreiner et al. | 540/123 |
| 5,066,796 | 11/1991 | Law | 540/140 |
| 5,453,501 | 9/1995 | Jager | 540/123 |

FOREIGN PATENT DOCUMENTS

| | | |
|---|---|---|
| A0001451 | 4/1979 | European Pat. Off. . |
| A0471456 | 2/1992 | European Pat. Off. . |
| A2200364 | 8/1988 | United Kingdom . |

OTHER PUBLICATIONS

Chemical Abstracts, vol. 69, Nov. 22, No. 25, 1968.

*Primary Examiner*—Mukund J. Shah
*Assistant Examiner*—Pavanaram K. Sripada
*Attorney, Agent, or Firm*—Watson Cole Stevens Davis, P.L.L.C.

[57] ABSTRACT

A phthalocyanine monoazo compound which is represented by the following formula (I):

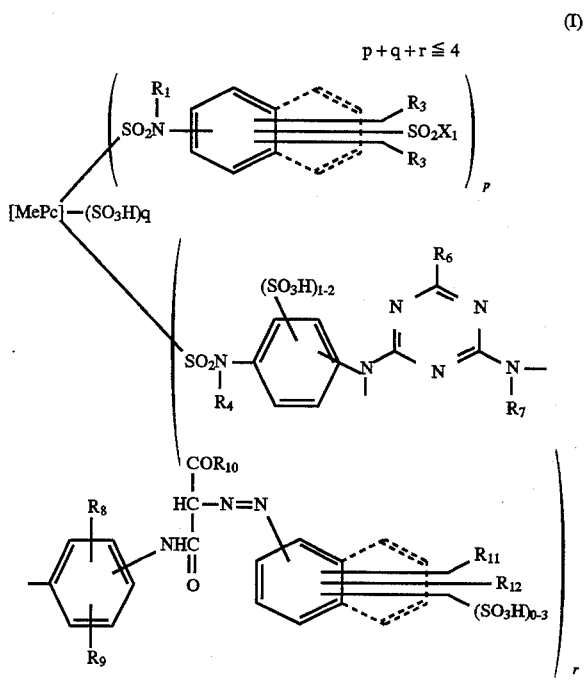

wherein the variable radicals have the meaning given in the description, and the phthalocyanine monoazo compound has green color.

6 Claims, No Drawings

PHTHALOCYANINE MONOAZO COMPOUNDS AND A PROCESS FOR PRODUCING THE SAME

The present invention relates to a fiber-reactive phthalocyanine monoazo compound and a process for producing the same. The compounds are suitable for using as a fiber-reactive green dye for a conventional dyeing or printing process.

Phthalocyanine monoazo compounds usable for dyeing fiber materials in green color are described in JP-A-1-221460, JP-A-2-115276, JP-A-4-261470, etc.

Hitherto, various kinds of reactive dyes for dyeing fiber materials in green color have been widely used in the field of dyeing or printing fiber-materials. However, the present technical level is not satisfactory to satisfy the high demand level in properties required for a specific dyeing method or to satisfy the trend of these days toward higher demand in fastness of dyed materials. The known reactive dyes mentioned above are not satisfactory in dyeing properties such as temperature sensitivity, salt sensitivity, alkaline sensitivity, liquor ratio dependency and build-up property. Hence, more improved dyes have been strongly demanded. Particularly, superior build-up property has become very important these days, because the demand level in economy of dyeing methods has been getting higher and higher.

So far, when dyeing a fiber material in green color is conducted with a mixed dye of a phthalocyanine type blue dye such as Reactive Blue 21, and a bright yellow dye, it is often difficult to dye fiber materials evenly with good reproducibility, due to the differences between the blue dye and the yellow dye in affinity and diffusion property. Hence, it is strongly demanded to solve the problems in dyeing properties of the conventional dyeing method such as uneven dyeing.

The present inventors have conducted extensive studies to solve the problems of the conventional dye such as the difference in affinity and diffusion property and to develop a novel compound usable for dyeing fiber materials in green color which is satisfactory in evenness of dyeing, dyeing reproducibility, build-up property, fastness and other widely demanded properties as dyes. As a result, it was found that a specific kind of phthalocyanine monoazo compound has excellent properties and the present invention was accomplished.

Thus, present invention provides a phthalocyanine monoazo compound (hereinafter referred to as Compound (I)) which is represented by the following general formula (I):

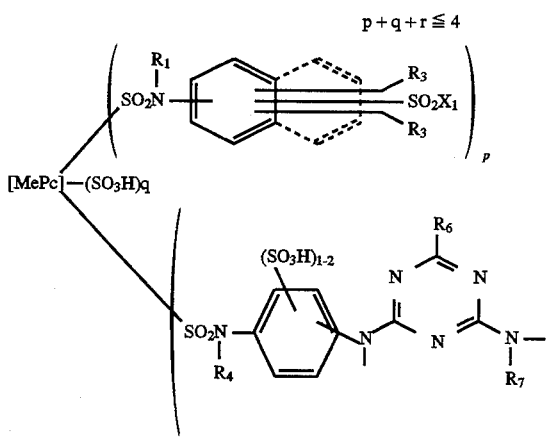

(I)

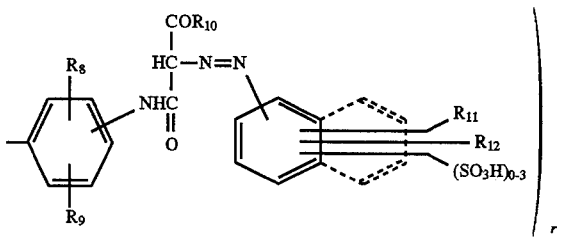

wherein

Pc represents a phthalocyanine group; Me represents nickel, cobalt or copper;

$R_1$, represents a hydrogen atom or an unsubstituted or substituted lower alkyl group;

$R_2$ and $R_3$ are the same or different and represent a hydrogen atom, an unsubstituted or substituted lower alkyl group, a lower alkoxy group or a sulfo group; $R_4$, $R_5$ and $R_7$ are the same or different and represent a hydrogen atom, or an unsubstituted or substituted lower alkyl group;

$R_6$ represents a chlorine atom, a fluorine atom, a bromine atom, a lower alkoxy group, an unsubstituted or substituted lower alkylamino group, a saturated nitrogen-containing heterocyclic group attached to the triazine nucleus via nitrogen or a phenylamino group which is unsubstituted or substituted by 1–3 groups or atoms selected from an unsubstituted or substituted lower alkyl group, a lower alkoxy group, a chlorine atom, a fluorine atom, a bromine atom, —COOH, —SO$_3$H or —SO$_2$X$_2$ group on the phenyl ring and which is unsubstituted or substituted by a substituted or unsubstituted lower alkyl group at the nitrogen atom of the amino group;

$R_8$ and $R_9$ are the same or different and represent a hydrogen atom, an unsubstituted or substituted lower alkyl group, a lower alkoxy group or a sulfo group;

$R_{10}$ represents an unsubstituted or substituted lower alkyl group;

$R_{11}$ and $R_{12}$ are the same or different and represent a hydrogen atom, an unsubstituted or substituted lower alkyl group, a lower alkoxy group, a phenoxy group, an acetylamino group, a propionylamino group, a maleinylamino group, a fumarylamino group, a succinylamino group or —SO$_2$X$_3$;

$X_1$, $X_2$ and $X_3$ are the same or different and represent —CH=CH$_2$ or —CH$_2$CH$_2$Y; Y represents a group removable by the action of an alkali;

p is from 0 to 2; q is from 1 to 3; r is from 1 to 2; and p+q+r is 4 or less;

provided that when p is 0, $R_6$ is a chlorine atom, a fluorine atom, a bromine atom or a phenylamino group which is substituted by at least one group SO$_2$X$_2$;

or a salt thereof;

and a method of dyeing or printing of a hydroxy- or nitrogen-containing organic material using the said compound or a mixture thereof.

In the present invention, the term "lower" means that it has about 4 or less carbon atoms, and the alkyl group means the one of straight or branched chain unless otherwise mentioned. In the present invention, as groups which can be a substituent in the substituted lower alkyl group, a hydroxy group, a cyano group, an alkoxy group, a halogen atom, a carboxy group, a carbamoyl group, an alkoxycarbonyl group, an alkylcarbonyloxy group, a sulfo group, and a sulfamoyl group are preferred, and number of the substituents is preferably one or two and more preferably one. Examples of the lower alkyl group which may be substituted in the formula (I) include a methyl group, an ethyl group, a n-propyl group, an isopropyl group, a n-butyl group, an isobutyl group, a secbutyl group, a 2-hydroxyethyl group, a 2-hydroxypropyl group, a 3-hydroxypropyl group, a 2-hydroxybutyl group, a 3-hydroxybutyl group, a 4-hydroxybutyl group, a 2,3-dihydroxypropyl group, a 3,4-dihydroxybutyl group, a cyanomethyl group, a 2-cyanoethyl group, a 3-cyanopropyl group, a methoxymethyl group, an ethoxymethyl group, a 2-methoxyethyl group, a 2-ethoxyethyl group, a 3-methoxypropyl group, a 3-ethoxypropyl group, a 2-hydroxy-3-methoxypropyl group, a chloromethyl group, a bromomethyl group, a 2-chloroethyl group, a 2-bromoethyl group, a 3-chloropropyl group, a 2-bromopropyl group, a 4-chlorobutyl group, a 4-bromobutyl group, a carboxymethyl group, a 2-carboxyethyl group, a 3-carboxypropyl group, a 4-carboxybutyl group, a 1,2-dicarboxyethyl group, a carbamoylmethyl group, a 2-carbamoylethyl group, a 3-carbamoylpropyl group, a 4-carbamoylbutyl group, a methoxycarbonylmethyl group, an ethoxycarbonylmethyl group, a 2-methoxycarbonylethyl group, a 2-ethoxycarbonylethyl group, a 3-methoxycarbonylpropyl group, a 3-ethoxycarbonylpropyl group, a 4-methoxycarbonylbutyl group, a 4-ethoxycarbonylbutyl group, a methylcarbonyloxymethyl group, an ethylcarbonyloxymethyl group, a 2-methylcarbonyloxyethyl group, a 2-ethylcarbonyloxyethyl group, a 3-methylcarbonyloxypropyl group, a 3-ethylcarbonyloxypropyl group, a 4-methylcarbonyloxybutyl group, a 4-ethylcarbonyloxybutyl group, a sulfomethyl group, a 2-sulfoethyl group, a 3-sulfopropyl group, a 4-sulfobutyl group, a sulfamoylmethyl group, a 2-sulfamoylethyl group, a 3-sulfamoylpropyl group and a 4-sulfamoylbutyl group.

In the present invention, examples of the lower alkylamino group which may be substituted include a methylamino group, an ethylamino group, an isopropylamino group, a n-propylamino group, a n-butylamino group, a secbutylamino group and an isobutylamino group each of which may be substituted by a lower alkoxy group, a carboxy group, a sulfo group or a lower alkoxycarbonyl group, and the like.

In the present invention, as the saturated nitrogen-containing heterocyclic group, that containing 5 or 6 atoms in the ring and optionally containing an additional hetero atom selected from oxygen and nitrogen is preferable. Examples of the saturated nitrogen-containing heterocyclic group include a morpholino group, a piperidino group and a piperazino group.

In the present invention, examples of the group removable by the action of an alkali represented by "Y" include a sulfato group, a thiosulfato group, a phosphato group, a group OCOCH$_3$, a chloro group, a fluoro group and a bromo group, among which the sulfato group and the chloro group are preferred.

Nickel and copper are preferred as Me in the formula (I) and a hydrogen atom, a methyl group and an ethyl group are preferred as R$_1$ in the formula (I).

A hydrogen atom and a sulfo group are preferred as R$_2$ or R$_3$ in the formula (I) and as examples of the phonylone or naphthylene substituted by R$_2$ and R$_3$, following can be mentioned:

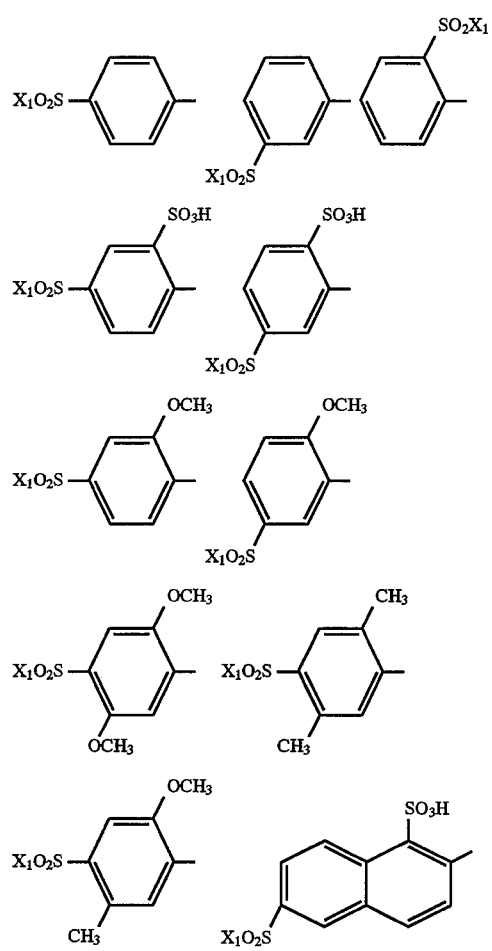

wherein X$_1$ has the same meaning as defined above.

A hydrogen atom, methyl group and ethyl group are preferred as R$_4$, R$_5$ or R$_7$ in the formula (I).

As examples of the phenylamino group of R$_6$ in the formula (I), following can be mentioned:

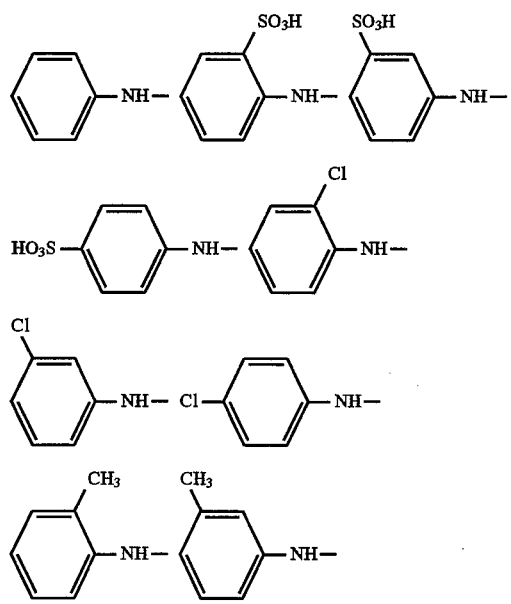

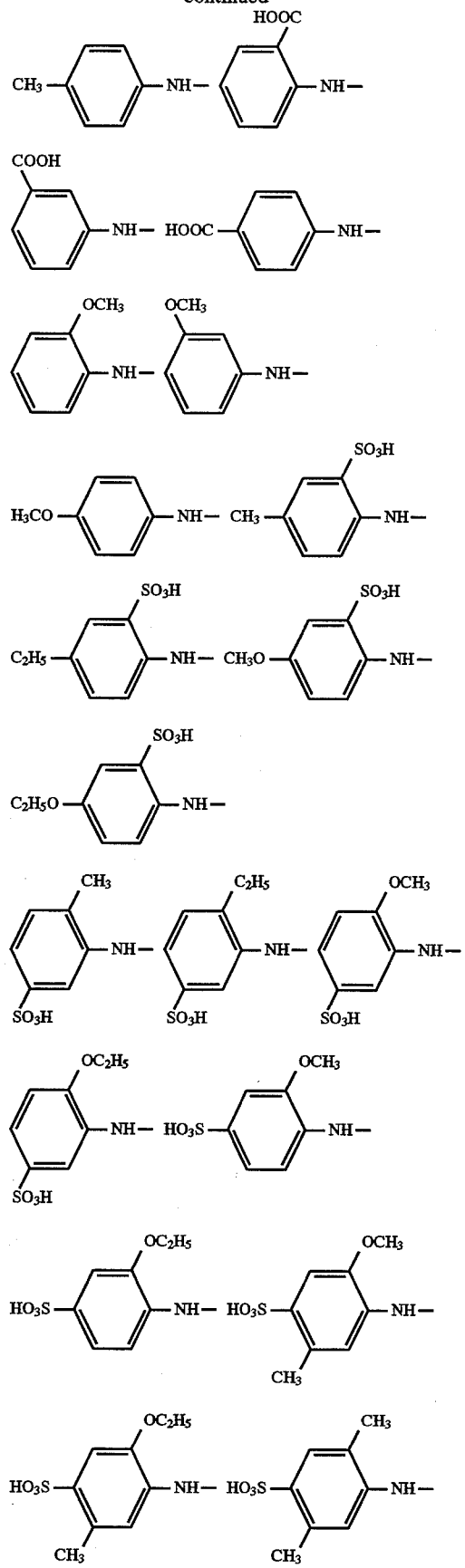

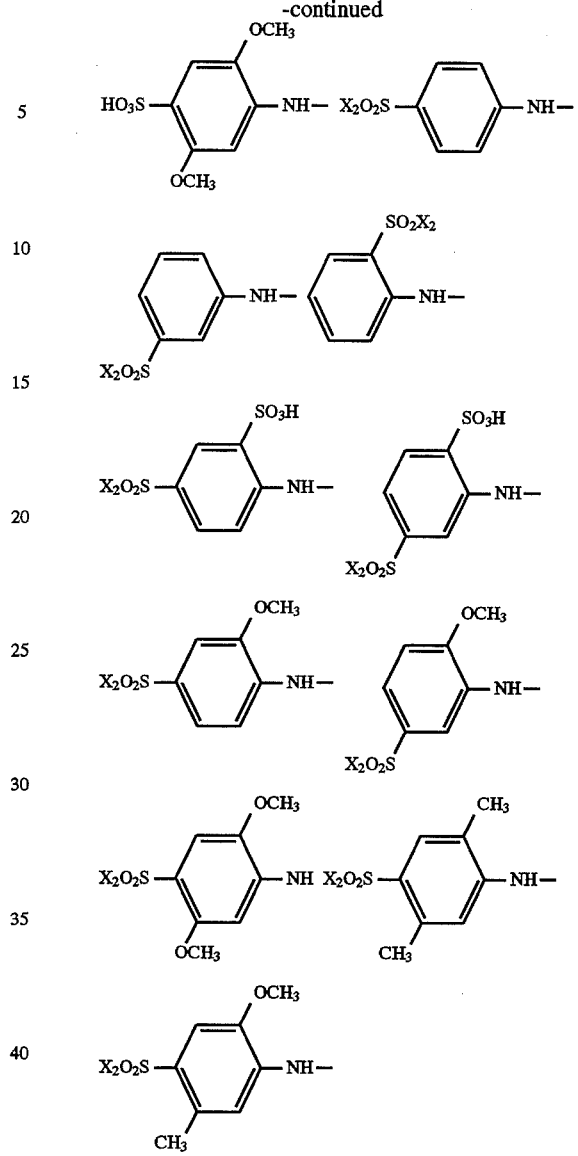

wherein $X_2$ has the same meaning as defined above.

As $R_8$ or $R_9$ in the formula (I), a methyl group, an ethyl group, a methoxy group and a sulfo group are preferred and a methoxy group and a sulfo group are more preferred. The position on which the acetoacetanilide monoazo residue is located in the phenylene group substituted by $R_8$ and $R_9$ is preferably 3- or 4- position against —$NR_7$ and more preferably 4- position.

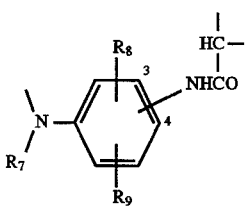

In the present invention, $R_{10}$ is preferably a methyl group or an ethyl group, and more preferably a methyl group.

As $R_{11}$ or $R_{12}$ in the formula (I), a methyl group, an ethyl group and a hydrogen atom are preferred.

As examples of the phenylene or naphthylene substituted by $R_{11}$ and $R_{12}$ following can be mentioned:
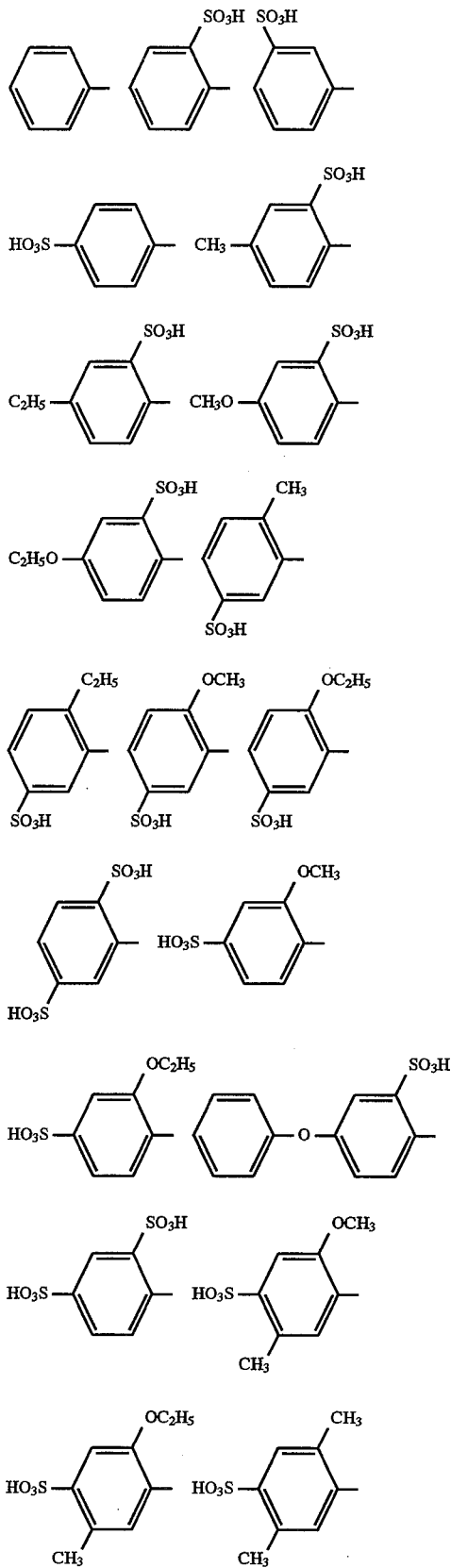
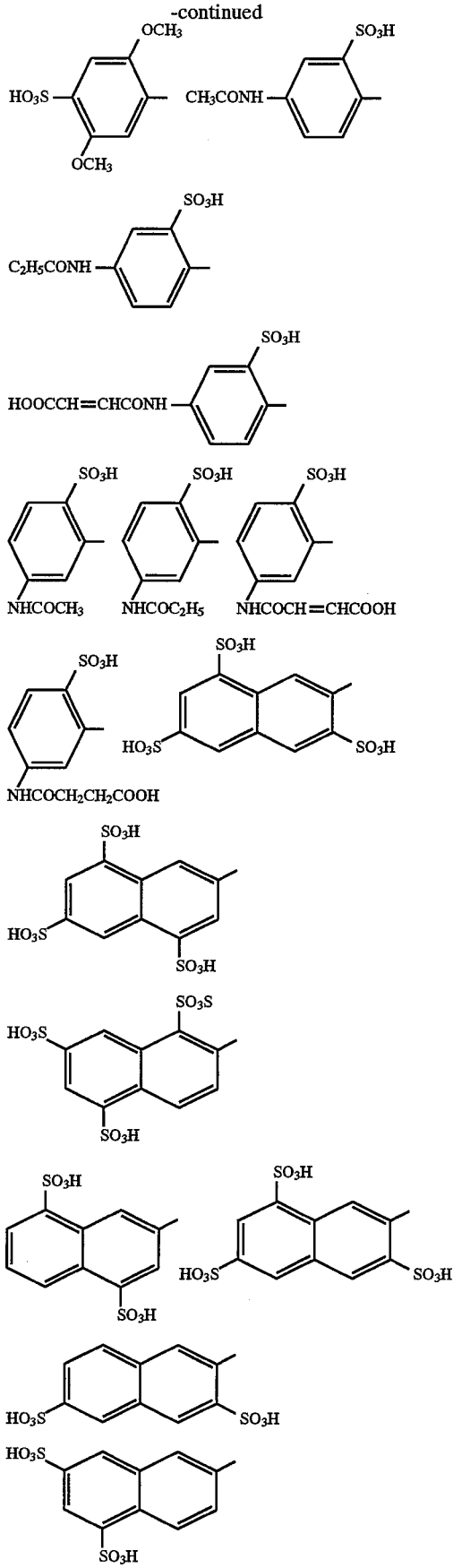

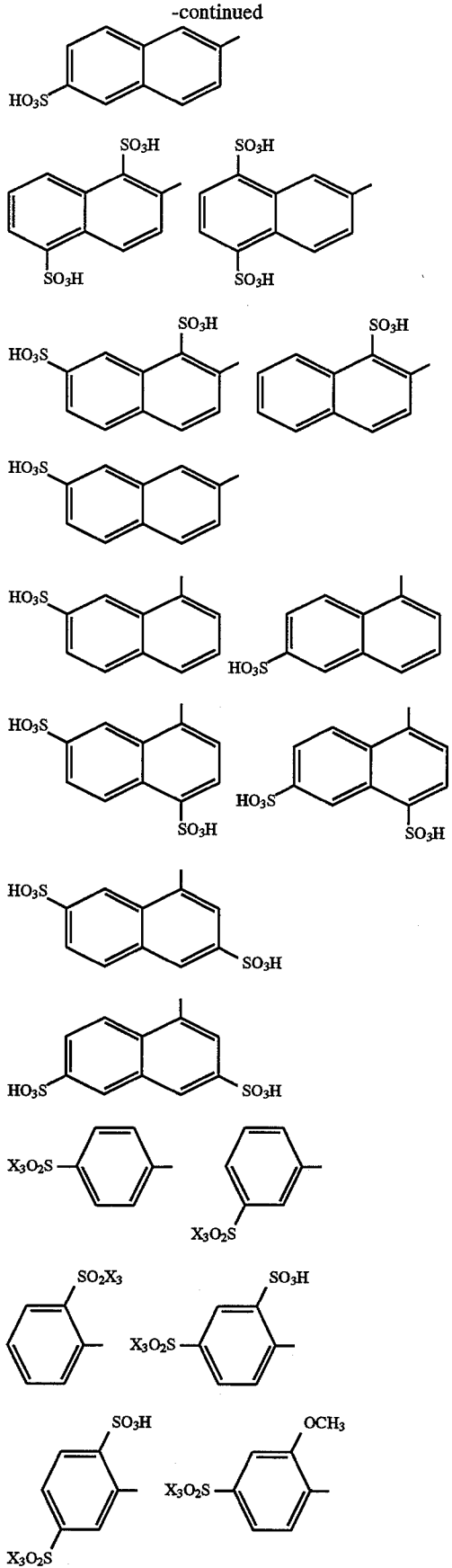

-continued

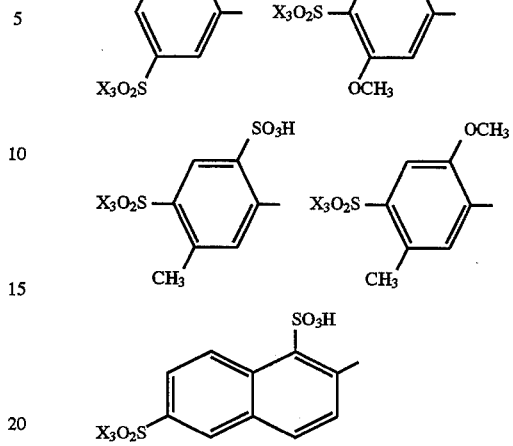

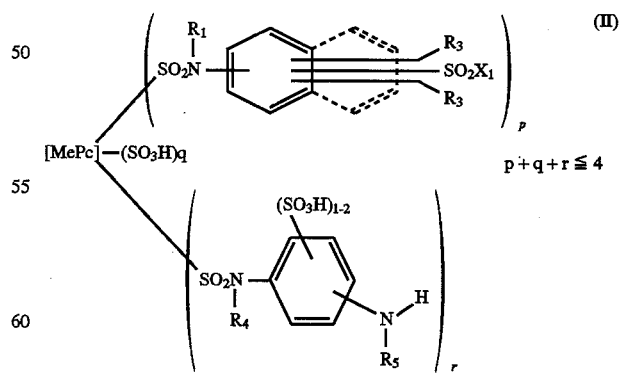

wherein $X_3$ has the same meaning as defined above.

In the present invention, when Compound (I) is in the form of a salt, kind of the cation accompanied by the sulfo group or by the carboxy group, if any, is not limited. The cation may be any one of non-chromophoric cations usual in the field of fiber-reacting dyes, in so far as the corresponding salt is water soluble. Examples of such cations include alkali metal cations such as a lithium, sodium and potassium cation, an unsubstituted ammonium cation and substituted ammonium cations such as a mono-, di-, tri-, or tetra-methylammonium, triethylammonium and mono-, di- or triethanolammonium cation.

The cations attached to the sulfo groups and those attached to the carboxy group, if any, may be the same or different and may be a mixture of cations such as the above listed cations. That is, Compound (I) may be in the form of a mixed salt.

Compound (I) can be produced, for example, by the following process. This process comprises condensing, in any optional order; a phthalocyanine compound represented by the following general formula (II):

wherein Pc, Me, $R_1$, $R_2$, $R_3$, $R_4$, $R_5$, $X_1$, p, q and r have the same meanings as defined above, which is in the form of a free acid or of a salt; a monoazo compound represented by the following general formula (III):

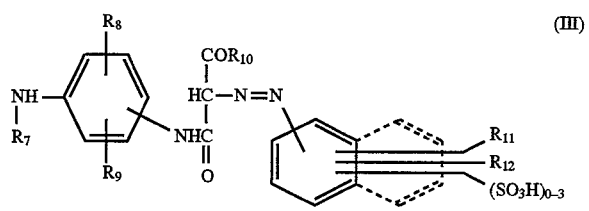 (III)

wherein $R_7$, $R_8$, $R_9$, $R_{10}$, $R_{11}$ and $R_{12}$ have the same meanings as defined above;

a 2,4,6-trihalogeno-s-triazine in which the halogen is fluorine, chlorine or bromine and;

if necessary, a compound represented by the general formula (IV):

$$R_6'H \qquad \text{(IV)}$$

wherein $R_6'$ represents an unsubstituted or substituted lower alkylamino group, a saturated nitrogen-containing heterocyclic group attached to the hydrogen atom via nitrogen, a phenylamino group which is unsubstituted or substituted, or a lower alkoxy group.

Examples of the unsubstituted or substituted lower alkylamino group represented by $R_6'$ include a methylamino group, an ethylamino group, an isopropylamino group, a n-propylamino group, a n-butylamino group, a sec-butylamino group and an isobutylamino group each of which is unsubstituted or substituted by, for example, a lower alkoxy group, a carboxy group, a sulfo group or a lower alkoxycarbonyl group.

Examples of the saturated nitrogen-containing heterocyclic group represented by $R_6'$ include a morpholino group, a piperidino group and a piperazino group.

Examples of the unsubstituted or substituted phenylamino group represented by $R_6'$ include groups listed above as examples of substituted phenylamino groups represented by $R_6$.

Examples of the lower alkoxy group represented by $R_6'$ include a methoxy group, an ethoxy group, an isopropoxy group, a n-propoxy group, a n-butoxy group, a sec-butoxy group and an isobutoxy group.

In the process for producing Compound (I), the order of the condensation reaction of 2,4,6-trihalogeno-s-triazine with other raw material is not particularly limited. Although the reaction conditions are not limited particularly, usually the condensation reaction of the unsubstituted 2,4,6-trihalogeno-s-triazine is conducted at the reaction temperature in a range of $-10°$ C. to $40°$ C. and the pH in a range of 2 to 9, the condensation reaction of the monosubstituted halogeno-s-triazine is conducted at the temperature in a range of $0°$ C. to $70°$ C. and the pH in a range of 2 to 9 and the condensation reaction of the disubstituted halogeno-s-triazine is conducted at the temperature in a range of $10°$ C. to $100°$ C. and the pH in a range of 2 to 7.

The phthalocyanine compound of formula (II), one of the starting material, are known or can be prepared by a known method using known compounds. The phthalocyanine compound can be prepared, for example, by conducting a chlorosulfonation of a phthalocyanine compound usual in the phthalocyanine dye field, followed by reactions with a diamine and an amine represented by the following general formulae (V) and (VI), respectively:

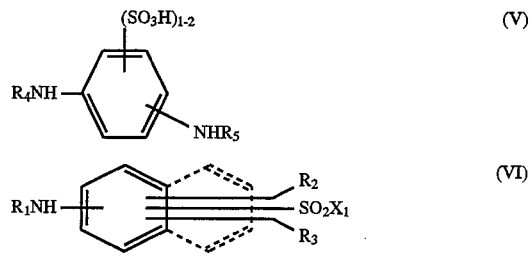

wherein $R_1$, $R_2$, $R_3$, $R_4$, $R_5$ and $X_1$ have the same meanings as defined above. The order of condensation is not particularly limited.

The monoazo compound represented by the formula (III) one of the starting material, also can easily be obtained by a known method, for example, by diazotizing a compound represented by the general formula (VII), shown below, and coupling with a compound represented by the general formula (VIII), shown below:

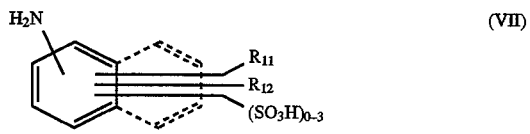

wherein $R_7$, $R_8$, $R_9$, $R_{10}$, $R_{11}$ and $R_{12}$ have the same meanings as defined above.

When $-SO_2X_1$, $-SO_2X_2-$ or $-SO_2X_3$ in the present invention is $-SO_2CH_2CH_2Y$ and the group removable by the action of an alkali represented by Y is an ester group such as a sulfato group or a phosphato group, the formation of such esters may be carried out after the condensation reaction or the coupling reaction.

For example, Compound (I) can be obtained by conducting a synthesis according to the method described above using a compound represented by general formula (IX) defined below;

a hydrolysate of the reactive group of the above monoazo compound (III) when it has a reactive group; and a compound represented by general formula (X) defined below when $R_6'$ has a fiber-reacting group, i.e., has at least one group represented by $SO_2X_2$ wherein $X_2$ has the same meaning as defined above;

and then converting the compound thus obtained by known method, e.g. esterification, to a compound of formula (I). In the method mentioned above, together with the hydrolysates, their corresponding ester may be used. The compounds of general formula (IX) and (X) are:

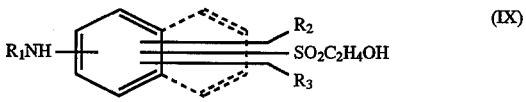 (IX)

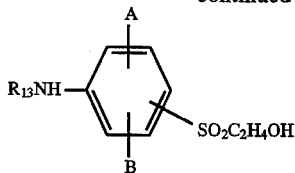

(X)

wherein $R_1$, $R_2$ and $R_3$ have the same meaning as defined above, $R_{13}$ represents a hydrogen atom or a lower alkyl group which may be substituted, A and B are the same or different and represent a lower alkyl group, a lower alkoxy group, a chlorine atom, a fluorine atom, a bromine atom, —COOH, —$SO_3H$ or —$SO_2X_2$.

As 2,4,6-trihalogeno-s-triazine, the starting material, cyanuric chloride and cyanuric fluoride are particularly preferred.

Depending on the conditions of the reaction and isolation, the compound of the invention is obtained in the form of a free acid or in the form of a salt or a mixed salt containing one or more cations such as cations described above. The form of a salt or a mixed salt is preferred. The compound can be converted from the free acid form to a salt form or vice versa or a salt form to another salt form, by conventional means.

Compound (I) and a mixture thereof are useful as fiber-reactive dyes for dyeing or printing hydroxy- or nitrogen-containing organic substrates. Preferred substrates are fiber materials containing or consisting of leathers, natural or synthetic polyamides and particularly natural cellulose, for example, cotton, viscose and cuprammonium rayon. The most preferred substrate is a fiber material containing cotton or that consisting of cotton. The dyeing or printing is carried out according to a usual known method for the fiber-reactive dyes and considering the physicochemical properties of the fiber materials.

Compound (I) and a mixture thereof do not give unlevelness which has been a problem when a brilliant green dyeing of a substrate containing cotton is conducted using a combination of a phthalocyanine blue and a yellow. In addition, the compounds of the invention have sufficient compatibility with other fiber-reactive dyes and can be applied in combination with other suitable fiber-reactive dyes of yellow, blue or the like having similar dyeing properties, for example, general fastness properties and degree of exhaustion from dye bath to fibers.

Compound (I) and a mixture thereof have a good build-up properties and give an excellent degree of exhaustion and fixation rates. Any unfixed material can be easily removed by washing from the substrate. Further, they have a good solubility, are less susceptible to variation of the amount of dyeing auxiliaries such as salts, alkali agents and the like and liquor ratio and give a stable dyed product. The obtained dyed products and printed products exhibit extremely good dry and wet color fastness to light. Also, they are excellent in wet color fastness properties, for example, excellent in washing, water, sea-water and perspiration fastness, and have a good color fastness to chlorination and fastness to washing with oxidative substances, for example, chlorinated water, hypochlorite bleaching agent or peroxide. Further, the obtained dyed products are less susceptible to discoloration on fixing treatment or resin finishing.

EXAMPLES

The following Examples are given to further illustrate the present invention. In the Examples, part and % mean part by weight and % by weight.

Example 1

(1) Blue condensate solution

Into 240 parts of chlorosulfonic acid was charged 57.6 parts of copper phthalocyanine blue with agitation and the mixture was stirred at 120°–130° C. for 3–4 hours. After cooling the mixture to 70° C., 50 parts of thionyl chloride was charged at 70° C. over 3–5 hours. Then, the mixture was gradually heated to 110°–120° C. and kept at the same temperature for 1–2 hours. The obtained reaction mass was discharged into ice-water at 0–5 T and filtered to give a wet cake. The wet cake was washed with water and then pasted with ice-water to afford about 450 parts of copper phthalocyanine sulfochloride slurry.

Into the above sulfochloride slurry were added a solution of 16 parts of 2,4-diaminobenzenesulfonic acid dissolved in 60 parts of water with the aid of caustic alkali, a solution of 39 parts of 1-aminobenzene-3-β-sulfatoethylsulfone dissolved in 70 parts of water with the aid of sodium carbonate and 1.5 part of pyridine. The mixture was stirred at about 20° C. for 10–15 hours. During this period, about 200 parts of 15% aqueous sodium carbonate solution was used in order to keep pH at 6.0–6.5. About 900 parts of Blue condensate reaction solution was obtained.

(2) Yellow base

With the aid of sodium hydroxide solution, 33 parts of 2-aminonaphthalene-3,6,8-trisulfonic acid was dissolved in 70 parts of water at pH of 7.0–8.0, and 6.0 parts of sodium nitrite was added to the resulting solution. The solution thus obtained was added dropwise into a mixture of 20 parts of 35% hydrochloric acid, 70 parts of water and 70% of ice at or below 10° C. to effect diazotization. After excess sodium nitrite was quenched with sulfamic acid, the diazotized solution was added dropwise in an about 10% aqueous solution of 25.7 parts of 2-amino-4-methoxy-5-(3'-oxobutyrylamino) benzenesulfonic acid. During this period, about 45 parts of 15% aqueous sodium carbonate solution was added in order to keep pH at 6.0–6.5. About 700 parts of Yellow base reaction solution was obtained.

(3) Formation of dye

Into a mixture of 80 parts of water and 80 parts of ice was charged 16.2 parts of 2,4,6-trichloro-s-triazine and the mixture was stirred to effect sufficient dispersion. Thereto, the Yellow base reaction solution described in (2) above was added and the mixture was stirred at 10°–15° C. for 1–2 hours. Then, the Blue condensate solution described in (1) above was added and the mixture was stirred at 40°–45° C. for 3–4 hours. During these periods, about 35 parts of 15% sodium carbonate solution was added in order to keep pH at 4.0–4.5 and 5.0–5.5, respectively. Thus, the compound represented by the following formula or salt thereof was obtained.

λmax: 398, 670 nm

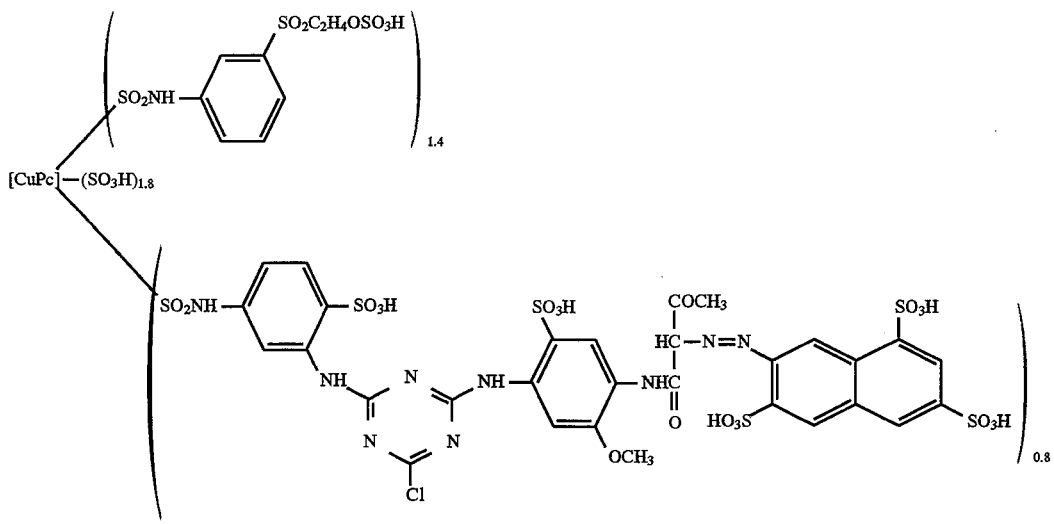

wherein Pc represents phthalocyanine group.

0.3 Part of the monoazo compound thus obtained was dissolved in 200 parts of water. Then 10 parts of sodium sulfate and 10 parts of a cotton cloth was added thereto and the bath temperature was raised to 60° C. After keeping 30 minutes, 4 parts of sodium carbonate was added thereto and dyeing was conducted for one hour. After completion of the dyeing, washing and soaping were conducted to obtain a green dyed product which excellent in various fastness. The compound exhibited good dyeing reproducibility.

Example 2–23

By conducting the same processes in Example 1 except that 1-aminobenzene-3-β-sulfatoethylsulfone used in the preparation of the Blue condensate solution in Example 1 is replaced with each of aminobenzene compounds or aminonaphthalene derivatives shown in the column 1 of the following Table 1–4 and 2,4-diaminobenzene sulfonic acid is replaced with each of diaminobenzene derivatives shown in the column 2 of the following Table 1–4, the corresponding phthalocyanine monoazo compound can be obtained. By conducting the dyeing by using them, dyed products having color shown in the column 3 of the following Table 1–4 can be obtained.

TABLE 1

| Ex. No.* | Column 1 | Column 2 | Column 3 |
| --- | --- | --- | --- |
| 2 | $CH_2=CHO_2S$—⌬—$NH_2$ | $HO_3S$—⌬($H_2N$, $SO_3H$, $NH_2$) | GREEN |
| 3 | $ClC_2H_4O_2S$—⌬—$NH_2$ | $HO_3S$—⌬($H_2N$, $NH_2$) | GREEN |
| 4 | $CH_3OCOC_2H_4O_2S$—⌬—$NH_2$ | $HO_3S$—⌬($CH_3NH$, $NH_2$) | GREEN |

TABLE 1-continued

| Ex. No.* | Column 1 | Column 2 | Column 3 |
|---|---|---|---|
| 5 | 3-(NHCH₃), 1-(HO₃SOC₂H₄O₂S)-benzene | 1-(HO₃S), 2-(C₂H₅NH), 4-(NH₂)-benzene | GREEN |
| 6 | 3-(NHC₂H₅), 1-(HO₃SOC₂H₄O₂S)-benzene | 1-(HO₃S), 2-(C₄H₉NH), 4-(NH₂)-benzene | GREEN |

*In Table 1–4, "Ex. No." means Example Number.

TABLE 2

| Ex. No. | Column 1 | Column 2 | Column 3 |
|---|---|---|---|
| 7 | 1-(CH₃O), 3-(HO₃SOC₂H₄O₂S), 4-(NH₂)-benzene | 1-(HO₃C), 2-(H₂N), 4-(NHCH₃)-benzene | GREEN |
| 8 | 1-(C₂H₅O), 3-(HO₃SOC₂H₄O₂S), 4-(NH₂)-benzene | 1-(HO₃S), 2-(H₂N), 4-(NHC₂H₅)-benzene | GREEN |
| 9 | 1-(SO₃H), 2-(NH₂), 4-(HO₃SOC₂H₄O₂S)-benzene | 1-(HO₃S), 2-(CH₃NH), 4-(NHCH₃)-benzene | GREEN |
| 10 | 4-(HO₃SOC₂H₄O₂S), 1-(NH₂)-benzene | 1-(HO₃S), 2-(CH₃NH), 4-(NHC₂H₅)-benzene | GREEN |
| 11 | 4-(CH₂=CHO₂S), 1-(NH₂)-benzene | 1-(HO₃S), 2-(CH₃NH), 4-(NHC₂H₅)-benzene | GREEN |

TABLE 2-continued

| Ex. No. | Column 1 | Column 2 | Column 3 |
|---|---|---|---|
| 12 | ClC$_2$H$_4$O$_2$S—C$_6$H$_4$—NH$_2$ (para) | 1-HO$_3$S, 2-C$_2$H$_5$NH, 4-NHCH$_3$ benzene | GREEN |

TABLE 3

| Ex. No. | Column 1 | Column 2 | Column 3 |
|---|---|---|---|
| 13 | CH$_3$OCOC$_2$H$_4$O$_2$S—C$_6$H$_4$—NH$_2$ (para) | 1-HO$_3$S, 2-H$_2$N, 4-NHC$_2$H$_4$Cl benzene | GREEN |
| 14 | HO$_3$SOC$_2$H$_4$O$_2$S—C$_6$H$_4$—NHCH$_3$ (para) | 1-HO$_3$S, 2-H$_2$N, 4-NHC$_2$H$_4$COOH benzene | GREEN |
| 15 | HO$_3$SOC$_2$H$_4$O$_2$S—C$_6$H$_4$—NHC$_2$H$_5$ (para) | 1-HO$_3$S, 2-H$_2$N, 4-NH$_2$ benzene | GREEN |
| 16 | 1-SO$_3$H, 2-NH$_2$, 4-HO$_3$SOC$_2$H$_4$O$_2$S benzene | 1-HO$_3$S, 2-C$_2$H$_5$NH, 4-NH$_2$ benzene | GREEN |
| 17 | 1-OCH$_3$, 2-NH$_2$, 4-HO$_3$SOC$_2$H$_4$O$_2$S benzene | 1-HO$_3$S, 2-H$_2$N, 4-NHCH$_3$ benzene | GREEN |
| 18 | 1-OCH$_3$, 2-NH$_2$, 4-HO$_3$SOC$_2$H$_4$O$_2$S, 5-CH$_3$ benzene | 1-HO$_3$S, 2-H$_2$N, 4-NHC$_2$H$_5$ benzene | GREEN |

TABLE 4

| Ex. No. | Column 1 | Column 2 | Column 3 |
|---|---|---|---|
| 19 | 1-OCH$_3$, 2-NH$_2$, 4-HO$_3$SOC$_2$H$_4$O$_2$S, 5-CH$_3$O benzene | 1-HO$_3$S, 2-C$_2$H$_5$NH, 4-NHC$_2$H$_5$ benzene | GREEN |

TABLE 4-continued

| Ex. No. | Column 1 | Column 2 | Column 3 |
|---|---|---|---|
| 20 | 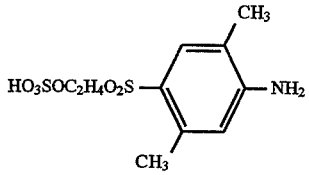 | 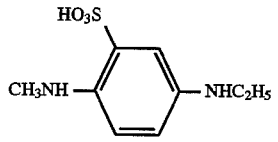 | GREEN |
| 21 | 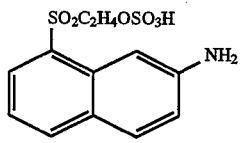 | 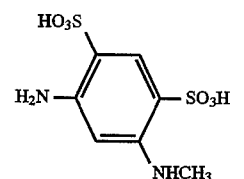 | GREEN |
| 22 | 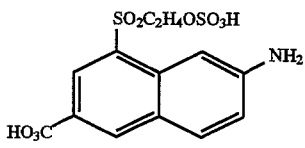 | 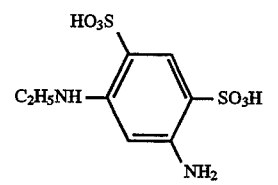 | GREEN |
| 23 | 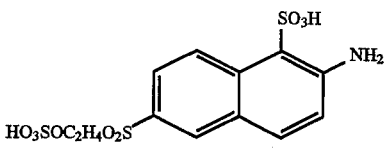 | 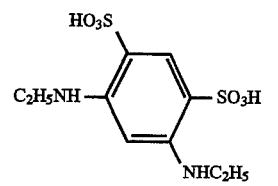 | GREEN |

Example 24–89

By conducting the same processes in Example 1 except that 2-aminonaphthalene-3,6,8-trisulfonic acid used in the preparation of the Yellow base in Example 1 is replaced with each of aminobenzene compounds or aminonaphthalene derivatives shown by the following formula (The numbers of the following formulae correspond to the Example number.), the corresponding phthalocyanine monoazo compound can be obtained. By conducting the dyeing by using them, dyed products having green color.

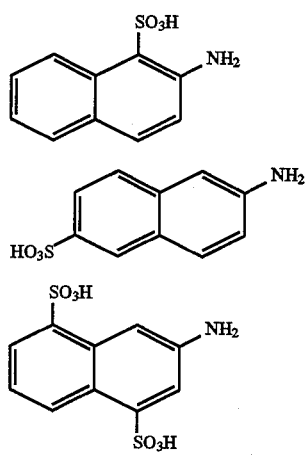

24

25

26

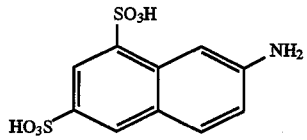 27

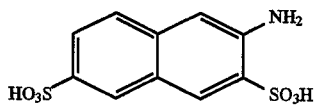 28

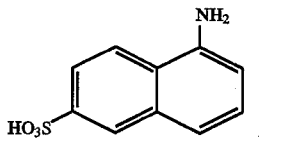 29

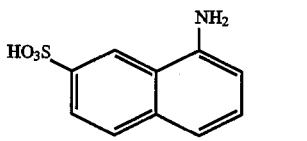 30

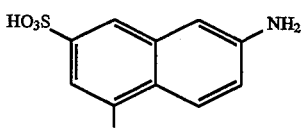 31

-continued
32 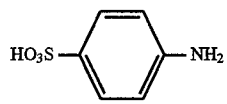
33 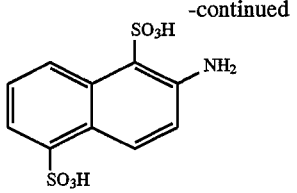
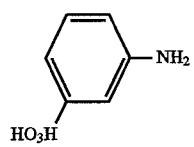 43
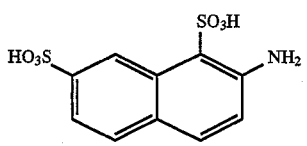
34 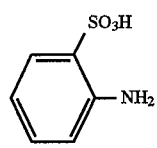 44
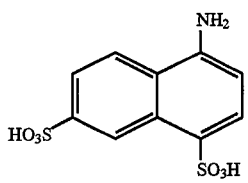
35 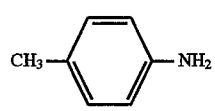 45
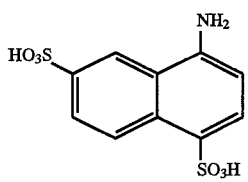
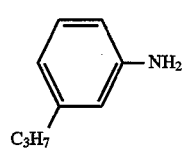 46
36 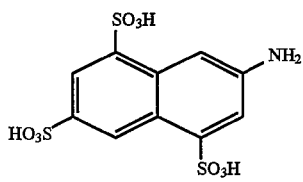
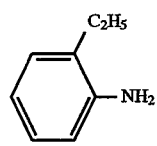 47
37 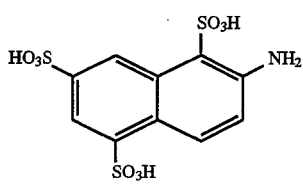
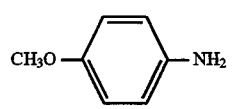 48
38 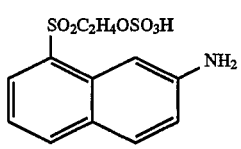
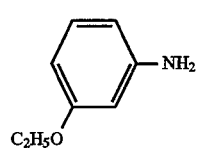 49
39 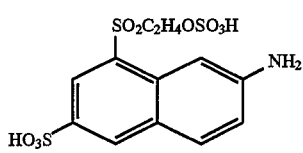
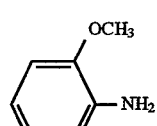 50
40 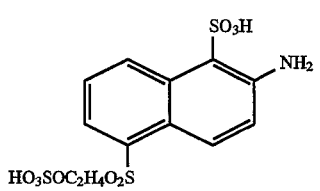
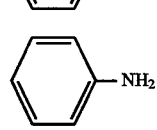 51
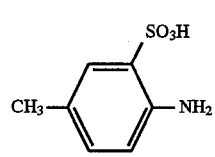 52
41 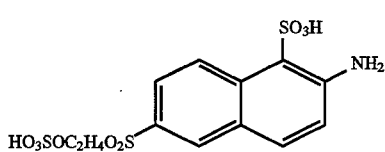
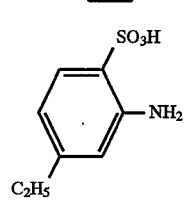 53

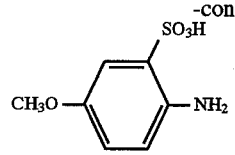 54
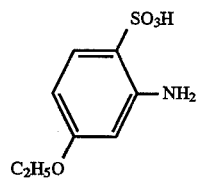 55
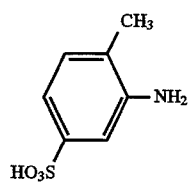 56
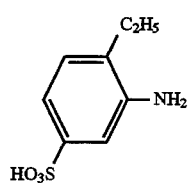 57
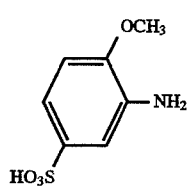 58
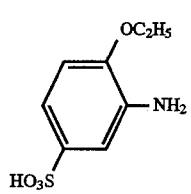 59
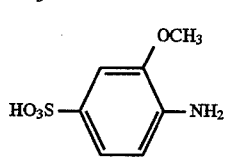 60
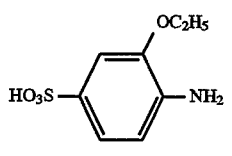 61
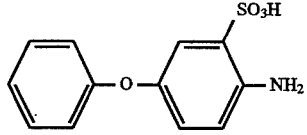 62
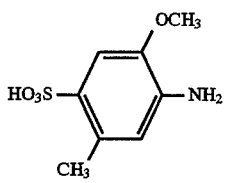 63
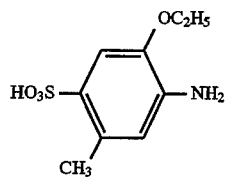 64
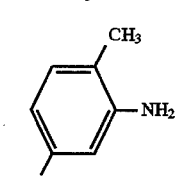 65
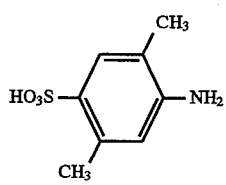 66
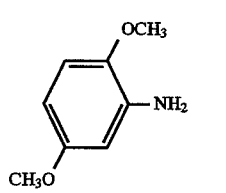 67
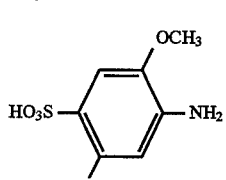 68
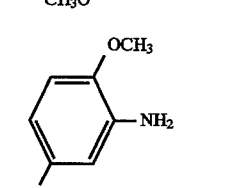 69
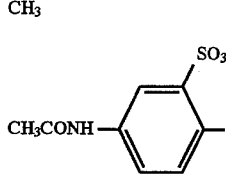 70
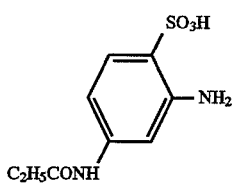 71
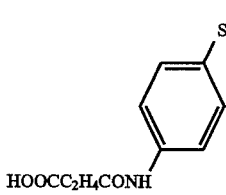 72

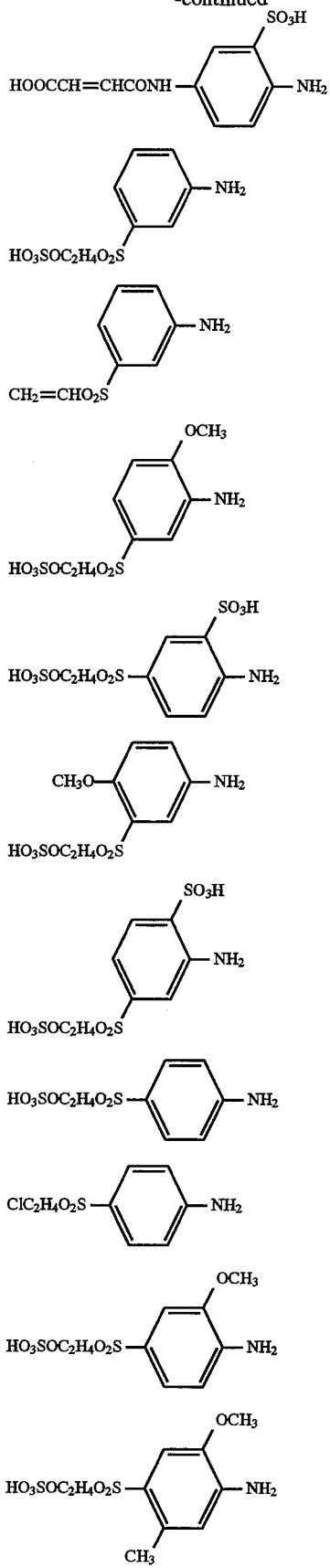

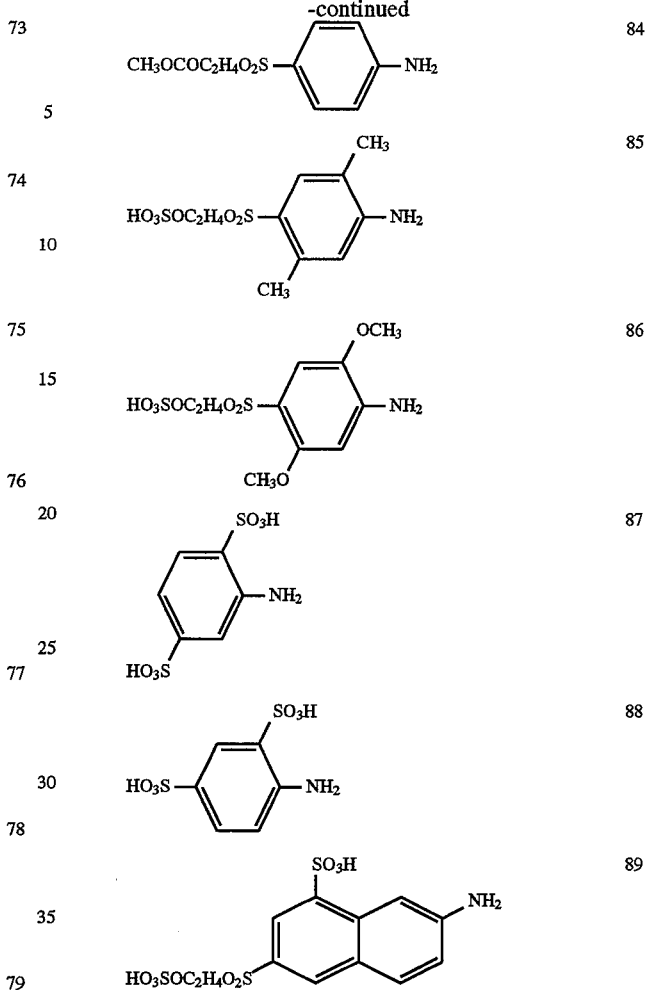

Example 90–110

By conducting the same processes in Example 1 except that 2-amino-4-methoxy-5-(3'-oxobutylylamino) benzenesulfonic acid used in the preparation of the Yellow base in Example 1 is replaced with each of compounds described by the following formula and the following Table 5–6, the corresponding phthalocyanine monoazo compound can be obtained. By conducting the dyeing by using them, dyed products having colors shown in the following Table 5–6 can be obtained. In the Table 5, substitution position means the position on the benzene ring where $R_{10}$ COCHCONH— in the following formula is substituted.

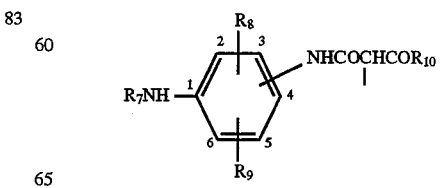

TABLE 5

| Ex. No. | $R_7$ | $R_8$ | $R_9$ | $R_{10}$ | Substitution Position | Color |
|---|---|---|---|---|---|---|
| 90 | H | 2-$SO_3H$ | 5-$OCH_3$ | $CH_3$ | 4 | Green |
| 91 | $C_2H_5$ | 2-$SO_3H$ | 5-$OCH_3$ | $C_2H_5$ | 4 | Green |
| 92 | H | 2-$SO_3H$ | 5-$OC_2H_5$ | $CH_3$ | 4 | Green |
| 93 | $C_2H_5$ | 2-$SO_3H$ | 5-$OC_2H_5$ | $CH_3$ | 4 | Green |
| 94 | H | 2-$SO_3H$ | 5-$OC_2H_5$ | $C_2H_5$ | 4 | Green |
| 95 | $CH_3$ | 2-$SO_3H$ | 5-$OCH_3$ | $CH_3$ | 4 | Green |
| 96 | $C_2H_5$ | 2-$SO_3H$ | 5-$OCH_3$ | $CH_3$ | 4 | Green |
| 97 | H | 2-$SO_3H$ | 5-$CH_3$ | $CH_3$ | 4 | Green |
| 98 | H | 2-$SO_3H$ | 5-$C_2H_5$ | $CH_3$ | 4 | Green |
| 99 | H | 2-$C_3H_7$ | 5-$OCH_3$ | $CH_3$ | 4 | Green |
| 100 | H | 2-$C_2H_5$ | 5-$C_2H_5$ | $CH_3$ | 4 | Green |
| 101 | H | 2-$OCH_3$ | 5-$OCH_3$ | $CH_3$ | 4 | Green |
| 102 | $C_2H_5$ | H | 5-$OCH_3$ | $CH_3$ | 4 | Green |
| 103 | H | 2-$SO_3H$ | H | $CH_3$ | 4 | Green |
| 104 | H | H | 5-$CH_3$ | $CH_3$ | 4 | Green |
| 105 | H | 2-$CH_3$ | H | $CH_3$ | 4 | Green |

TABLE 6

| Ex. No. | $R_7$ | $R_8$ | $R_9$ | $R_{10}$ | Substitution Position | Color |
|---|---|---|---|---|---|---|
| 106 | H | 2-$OC_2H_5$ | H | $CH_3$ | 4 | Green |
| 107 | H | H | H | $CH_3$ | 5 | Green |
| 108 | H | H | H | $C_2H_5$ | 4 | Green |
| 109 | H | 2-$CH_3$ | 6-$CH_3$ | $CH_3$ | 5 | Green |
| 110 | H | 3-$OCH_3$ | 5-$OCH_3$ | $C_2H_5$ | 4 | Green |

Example 111

By conducting the same processes in Example 1 except that 2,4,6-trichloro-s-triazine used in the formation of dye in Example 1 is replaced with 2,4,6-trifluoro-s-triazine or with 2,4,6-tribromo-s-triazine, the corresponding phthalocyanine monoazo compound can be obtained.

Example 112

To the final reaction solution obtained in Example 1, 28.1 parts of 1-aminobenzene-3-β-sulfatoethylsulfone dissolved in 60 parts of water with the aid of sodium carbonate was added and then the reaction was conducted at 65°–7 ° C. for 8–10 hours. During this periods, about 35 parts of 15% sodium carbonate solution was added in order to keep pH at 2.5–3.0. Thus, the compound represented by the following formula wherein p is 1.4, q is 1 and r is 0.8 was obtained in the free acid form.

λmax: 398, 670 nm

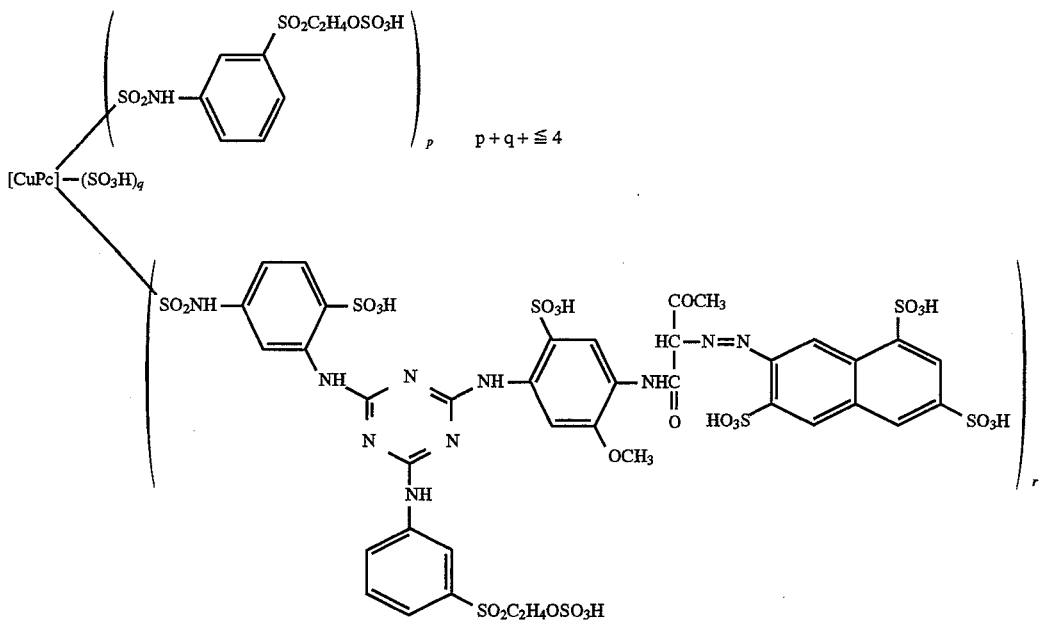

wherein Pc represents phthalocyanine group.

0.3 Part of the monoazo compound thus obtained was dissolved in 200 parts of water. Then 10 parts of sodium sulfate and 10 parts of a cotton cloth was added thereto and the bath temperature was raised to 60° C. After keeping 30 minutes, 4 parts of sodium carbonate was added thereto and dyeing was conducted for one hour. After completion of the dyeing, washing and soaping were conducted to obtain a green dyed product which is excellent in various fastness and superior in build-up property to that obtained by using the compound described in Example 1.

Example 113

Example 1 was repeated except that, in the synthesis of (1) Blue condensate solution, the amount of 2,4-diaminobenzene sulfonic acid was 18.8 parts, 22.5 parts or 28.2 parts instead of 16 parts, and the amount of 1-aminobenzene-3-β-sulfatoethylsulfone was 22.5 parts, 14.1 parts or 0 part, respectively instead of the 39 parts; and, in the (3) Formation of dye, the amount of cyanuric chloride was 19 parts, 23 parts or 28 parts, respectively instead of 16.2 parts and the amount of Yellow base was changed so that it became 1.06 fold, 1.18 fold or 7.29 fold of the amount in Example 1, respectively.

Then, example 172 was repeated except that as the final reaction solution, the final reaction solution of the above reaction was used and the amount of 1-aminobenzene-3-β-sulfatoethylsulfone was 33 parts, 42 parts or 53 parts, respectively, instead of 28.1 parts to obtain a compound represented by the formula shown in Example 772 wherein p is 0.8, 0.5 or 0, q is 2.3, 2.55 or 3.0 and r is 0.9, 0.95 or 1.0, respectively.

0.3 Part of each of the monoazo compound thus obtained was dissolved in 200 parts of water. Then 10 parts of sodium sulfate and 10 parts of a cotton cloth was added thereto and the bath temperature was raised to 60° C. After keeping 30 minutes, 4 parts of sodium carbonate was added thereto and dyeing was conducted for one hour. After completion of the dyeing, washing and soaping were conducted to obtain an yellowish green dyed product which is excellent in various fastness and good in build-up property.

Example 114–163

By conducting the same processes in Example 112 except that 1-aminobenzene-3-β-sulfatoethylsulfone used in Example 112 is replaced with a compound represented by RNHR" wherein the meanings of R and R" are as described in Table 7–9, the corresponding phthalocyanine monoazo compound can be obtained and green dyed product can be obtained by conducting dyeing by using them.

TABLE 7

| Ex. No. | R | R" |
|---|---|---|
| 114 | $C_6H_5$ | H |
| 115 | $C_6H_4SO_3H$-2 | H |
| 116 | $C_6H_4SO_3H$-3 | H |
| 117 | $C_6H_4SO_3H$-4 | H |
| 118 | $C_6H_4CH_3$-4 | H |
| 119 | $C_6H_4C_2H_5$-2 | H |
| 120 | $C_6H_4C_3H_7$-3 | H |
| 121 | $C_6H_4OCH_3$-4 | H |
| 122 | $C_6H_4OCH_3$-2 | H |
| 123 | $C_6H_4OC_2H_5$-3 | H |
| 124 | $C_6H_3(SO_3H$-2$)CH_3$-4 | H |
| 125 | $C_6H_3(SO_3H$-2$)C_2H_5$-5 | H |

TABLE 8

| Ex. No. | R | R" |
|---|---|---|
| 126 | $C_6H_3(SO_3H$-2$)OCH_3$-4 | H |
| 127 | $C_6H_3(SO_3H$-2$)OC_2H_5$-5 | H |
| 128 | $C_6H_3(SO_3H$-5$)CH_3$-2 | H |
| 129 | $C_6H_3(SO_3H$-5$)C_2H_5$-2 | H |
| 130 | $C_6H_3(SO_3H$-5$)OCH_3$-2 | H |
| 131 | $C_6H_3(SO_3H$-5$)OC_2H_5$-2 | H |
| 132 | $C_6H_3(SO_3H$-4$)OCH_3$-2 | H |
| 133 | $C_6H_3(SO_3H$-4$)OC_2H_5$-2 | H |

TABLE 8-continued

| Ex. No. | R | R" |
|---|---|---|
| 134 | $C_6H_4COOH-2$ | H |
| 135 | $C_6H_4COOH-3$ | H |
| 136 | $C_6H_4COOH-4$ | H |
| 137 | $C_6H_4Cl-4$ | H |
| 138 | $C_6H_4Cl-3$ | H |
| 139 | $C_6H_4Br-2$ | H |
| 140 | $C_6H_2(SO_3H-4)(OCH_3-2)CH_3-5$ | H |
| 141 | $C_6H_2(SO_3H-4)(OC_2H_5-2)CH_3-5$ | H |
| 142 | $C_6H_3(CH_3)_2-2,5$ | H |
| 143 | $C_6H_2(SO_3H-4)(CH_3)_2-2,5$ | H |
| 144 | $C_6H_3(OCH_3)_2-2,5$ | H |
| 145 | $C_6H_2(SO_3H-4)(OCH_3)_2-2,5$ | H |
| 146 | $C_6H_3(OCH_3-2)CH_3-4$ | H |
| 147 | $C_6H_4SO_2CH=CH_2-3$ | H |
| 148 | $C_6H_3(SO_2C_2H_4OSO_3H-3)OCH_3-4$ | H |
| 149 | $C_6H_3(SO_2C_2H_4OSO_3H-3)SO_3H-2$ | H |

TABLE 9

| Ex. No. | R | R" |
|---|---|---|
| 150 | $C_6H_4SO_2C_2H_4OSO_3H-4$ | H |
| 151 | $C_6H_4SO_2C_2H_4OCOCH_3-4$ | H |
| 152 | $C_6H_3(SO_2C_2H_4OSO_3H-4)SO_3H-2$ | H |
| 153 | $C_6H_3(SO_2C_2H_4OSO_3H-4)OCH_3-2$ | H |
| 154 | $C_6H_2(SO_2C_2H_4OSO_3H-4)(OCH3-2)CH3-5$ | H |
| 155 | $C_6H_2(SO_2C_2H_4OSO_3H-4)(CH_3)_2-2,5$ | H |
| 156 | $C_6H_2(SO_2C_2H_4OSO_3H-4)(OCH_3)_2-2,5$ | H |
| 157 | $C_6H_4SO_2C_2H_4OSO_3H-3$ | $C_2H_5$ |
| 158 | $C_6H_4SO_2C_2H_4Cl$ | $CH_3$ |
| 159 | $C_6H_4SO_2C_2H_4OSO_3H-4$ | $C_2H_5$ |
| 160 | $HOOCCH_2$ | H |
| 161 | $CH_3$ | H |
| 162 | $C_2H_5$ | H |
| 163 | $C_4H_9$ | H |

Example 164

0.3 Part of each of the monoazo compound obtained in Example 1 or 112 was dissolved in 200 parts of water. Then 10 parts of sodium sulfate and 10 parts of a cotton cloth was added thereto and the bath temperature was raised to 70°–90° C.

After keeping 30 minutes, 4 parts of sodium carbonate was added thereto and dyeing was conducted for one hour. After completion of the dyeing, washing and soaping were conducted to obtain a green dyed product which is excellent in various fastness and good in build-up property.

Example 165

By conducting the same processes in Example 1 and, if necessary, the same processes in Example 112 except that copper phthalocyanine blue used in Example 1–112 and is replaced with nickel phthalocyanine blue, the corresponding nickel phthalocyanine derivative of each Examples can be obtained.

The compound of the present invention exhibits good evenness and reproducibility of dyeing as a hydroxy- or nitrogen-containing organic substrate and has good dyeing property such as build-up property, temperature sensitivity, salt sensitivity, alkali sensitivity and bath-ratio dependency and is good in various fastness.

What we claim is:

1. A phthalocyanine monoazo derivative represented by the formula (I):

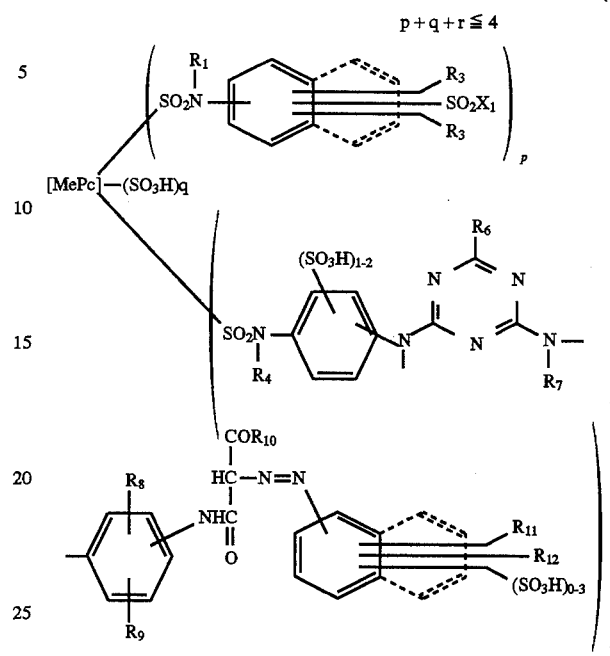

wherein

Pc represents a phthalocyanine group; Me represents nickel, cobalt or copper;

$R_1$ represents a hydrogen atom or an unsubstituted or substituted lower alkyl group;

$R_2$ and $R_3$ are the same or different and represent a hydrogen atom, an unsubstituted or substituted lower alkyl group, a lower alkoxy group or a sulfo group;

$R_4$, $R_5$ and $R_7$ are the same or different and represent a hydrogen atom, or an unsubstituted or substituted lower alkyl group;

$R_6$ represents a chlorine atom, a fluorine atom, a bromine atom, a lower alkoxy group, an unsubstituted or substituted lower alkylamino group, a 6-member nitrogen-containing monocyclic group which may further contain oxygen atom attached to the triazine nucleus via nitrogen or a phenylamino group which is unsubstituted or substituted by 1–3 groups or atoms selected from an unsubstituted or substituted lower alkyl group, a lower alkoxy group, a chlorine atom, a fluorine atom, a bromine atom, —COOH, —$SO_3H$ or —$SO_2X_2$ group on the phenyl ring and which is unsubstituted or substituted by a substituted or unsubstituted lower alkyl group at the nitrogen atom of the amino group;

$R_8$ and $R_9$ are the same or different and represent a hydrogen atom, an unsubstituted or substituted lower alkyl group, a lower alkoxy group or a sulfo group;

$R_{10}$ represents an unsubstituted or substituted lower alkyl group;

$R_{11}$ and $R_{12}$ are the same or different and represent a hydrogen atom, an unsubstituted or substituted lower alkyl group, a lower alkoxy group, a phenoxy group, an acetylamino group, a propionylamino group, a maleinylamino group, a fumarylamino group, a succinylamino group or —$SO_2X_3$;

$X_1$, $X_2$ and $X_3$ are the same or different and represent —CH=$CH_2$ or —$CH_2CH_2Y$; Y represents a sulfate group a thio sulfate group, a phosphate group, a group $OCOCH_3$, a chloro group, a fluoro group or a bromo group;

p is from 0 to 2; q is from 1 to 3; r is from 1 to 2; and p+q+r is 4 or less;

provided that when p is 0, $R_6$ is a chlorine atom, a fluorite atom, a bromine atom or a phenylamino group which is substituted by at least one group $SO_2X_2$;

or a salt thereof.

2. A compound according to claim 1 wherein Me is copper or nickel.

3. A compound according to claim 1 wherein $R_6$ is a phenylamino group substituted by —$SO_2X_2$ in which $X_2$ has the same meaning as in claim 1.

4. A compound according to claim 1 wherein p is not 0.

5. A method of dying or printing of a fiber material comprising at least one member selected from the group consisting of leathers, polyamides and cellulose, by contacting at least one compound according to claim 1 with said material.

6. A method according to claim 5 wherein the substrate is a fiber material which comprises leather, natural cellulose and/or regenerated cellulose or a fiber material consisting of leather, natural cellulose and/or regenerated cellulose.

* * * * *